(12) United States Patent
White et al.

(10) Patent No.: US 12,522,728 B2
(45) Date of Patent: Jan. 13, 2026

(54) POLYAMIDE FORMULATIONS FOR LONG TERM HIGH TEMPERATURE PERFORMANCE

(71) Applicant: Ascend Performance Materials Operations LLC, Houston, TX (US)

(72) Inventors: Kimberly M. White, Houston, TX (US); Bradley J. Sparks, Houston, TX (US); Jacob G. Ray, Houston, TX (US)

(73) Assignee: Ascend Performance Materials Operations LLC, Houston, TX (US)

( * ) Notice: Subject to any disclaimer, the term of this patent is extended or adjusted under 35 U.S.C. 154(b) by 393 days.

(21) Appl. No.: 17/983,633

(22) Filed: Nov. 9, 2022

(65) Prior Publication Data

US 2023/0147577 A1     May 11, 2023

Related U.S. Application Data

(60) Provisional application No. 63/277,424, filed on Nov. 9, 2021.

(51) Int. Cl.

| | |
|---|---|
| C08L 77/10 | (2006.01) |
| C08K 5/00 | (2006.01) |
| C08K 5/098 | (2006.01) |
| C08K 5/11 | (2006.01) |
| C08K 5/13 | (2006.01) |
| C08K 5/20 | (2006.01) |
| C08K 7/14 | (2006.01) |

(52) U.S. Cl.
CPC .............. *C08L 77/10* (2013.01); *C08K 5/005* (2013.01); *C08K 5/0066* (2013.01); *C08K 5/098* (2013.01); *C08K 5/11* (2013.01); *C08K 5/13* (2013.01); *C08K 5/20* (2013.01); *C08K 7/14* (2013.01)

(58) Field of Classification Search
CPC ....................................................... C08L 77/10
See application file for complete search history.

(56) References Cited

U.S. PATENT DOCUMENTS

| | | | |
|---|---|---|---|
| 2005/0119379 A1* | 6/2005 | Martens | C08K 5/5313 524/404 |
| 2008/0070023 A1 | 3/2008 | Topoulos | |
| 2011/0015328 A1 | 1/2011 | Orihashi | |
| 2013/0309928 A1* | 11/2013 | Desio | D01F 1/04 428/221 |
| 2017/0275459 A1 | 9/2017 | Hewel et al. | |
| 2019/0225750 A1* | 7/2019 | Lamberts | C08G 69/14 |

OTHER PUBLICATIONS

International Application No. PCT/US2022/049363, "International Search Report", mailed Feb. 13, 2023, 11 pages.

* cited by examiner

*Primary Examiner* — Marc S Zimmer
*Assistant Examiner* — Virginia L Stonehocker
(74) *Attorney, Agent, or Firm* — Womble Bond Dickinson (US) LLP

(57) ABSTRACT

Provided herein is a polymer composition comprising an aromatic polyamide comprising terephthalic units and isophthalic units or a 6T/DT copolymer and having an overall high aromaticity, with a heat stabilizer and/or a lubricant. The polymer composition demonstrates improved electrical performance in terms of volume resistivity and dielectric strength.

20 Claims, No Drawings

POLYAMIDE FORMULATIONS FOR LONG TERM HIGH TEMPERATURE PERFORMANCE

CROSS REFERENCE TO RELATED APPLICATION

This application claims priority to U.S. Provisional Application No. 63/277,424, filed on Nov. 9, 2021, which is incorporated herein by reference.

FIELD

The present disclosure relates to polyamide compositions, particularly polyamide compositions having improved electrical performance under demanding conditions.

BACKGROUND

Polyamide resin compositions are known to have beneficial physical properties such as high melting points, high recrystallization temperatures, faster injection molding cycle times, high flow, toughness, elasticity, chemical resistance, inherent UL94 V2 flame retardancy, and abrasion resistance. These properties often make them ideal for high performance automotive and electrical/electronic applications. However, when plastic parts are exposed to high temperatures for a prolonged period, such as in automotive applications or in electrical/electronic applications, the mechanical properties generally tend to decrease due to the thermo-oxidation of the polymer. This phenomenon is often referred to as heat aging.

In an attempt to improve heat aging characteristics of polymers, it has been the conventional practice to add heat stabilizers to the polymer compositions. However, the heat aging characteristics of existing technologies are usually insufficient for more demanding applications involving exposure to higher temperatures, e.g., automotive applications and electrical/electronic applications. Also, the addition of some heat stabilizers often detracts from other performance features, e.g., processability or electrical properties. In many cases, gains in heat age performance lead to losses in processability.

Additionally, while the addition of stabilizers to the polyamide resins may improve heat aging, these additional components may also add other unwanted compounds/elements. For example, the addition of some conventional heat stabilizers often introduces halogen compounds to the composition, which may contribute negatively to the "non-halogen" rating of a polymer composition. This is especially germane to flame retardant polymer compositions.

Thus, the need exists for polyamide compositions capable of providing effective mechanical performance at higher temperatures, while preferably maintaining other performance features, e.g., flame retardancy, processability, or electrical properties, e.g., volume resistivity.

SUMMARY

In one aspect, there is provided a polymer composition comprising an aromatic polyamide comprising terephthalic units and isophthalic units and having an overall aromaticity greater than 31%, a heat stabilizer, and an optional lubricant. The long term high temperature performance is improved. In one embodiment, the polymer composition demonstrates a volume resistivity greater than 1.0E+10 Ohm-cm, as measured via IEC 62631 under elevated temperature such as at 150° C. In one embodiment, the polymer composition demonstrates a dielectric strength of greater than 25 KV/mm as measured via IEC 60243 under elevated temperature such as 150° C. Preferably, the polymer composition retains dielectric strength retention under humidity aging. Accordingly, in one embodiment, the composition demonstrates a tensile strength greater than 85 MPa when moisture treated for 1K hours at a temperature of 85° C. and 85% relative humidity, and a volume resistivity greater than 5.0E+13 Ohm-cm, when moisture treated for 1K hours at a temperature of 85° C. and 85% relative humidity. The aromatic polyamide may have an overall aromaticity greater than 35%. In one embodiment, the aromatic polyamide comprises adipic acid units in addition to the terephthalic and isophthalic acid units and has an overall aromaticity greater than 32%. The aromatic polyamide may comprise 6I/6T, 6T/6I/66, or 6T/66/6I, or combinations thereof. The difference in content of terephthalic units and isophthalic units, combined, and adipic units may range from 30 to 100. The aromatic polyamide may comprises from 35 wt % to 100 wt % terephthalic units, based on the total weight of the aromatic polyamide. In one embodiment, the aromatic polyamide comprises from 10 wt % to 70 wt % isophthalic units, based on the total weight of the aromatic polyamide. Some embodiments may also comprise PA6 in an amount from 0 wt % to 10 wt %. The polymer composition comprises from 25 wt % to 95 wt % aromatic polyamide, based on the total weight of the polymer composition. In one embodiment, heat stabilizer is a hindered phenol such as N,N'-hexamethylene bis[3-(3,5-dit-butyl-4-hydroxyphenyl)propionamide. In one embodiment, the lubricant is a montanate.

In one aspect of the present invention, there is provided polymer composition comprising a 6T/DT copolymer having an overall aromaticity greater than 25%, a heat stabilizer, an optional lubricant. In one embodiment, the polymer composition demonstrates a volume resistivity greater than 1.0E+10 Ohm-cm, as measured via IEC 62631 under elevated temperature such as at 150° C. In one embodiment, the polymer composition demonstrates a dielectric strength of greater than 25 KV/mm as measured via IEC 60243 under elevated temperature such as 150° C. Preferably, the polymer composition retains dielectric strength retention under humidity aging. Accordingly, in one embodiment, the composition demonstrates a tensile strength greater than 85 MPa when moisture treated for 1K hours at a temperature of 85° C. and 85% relative humidity, and a volume resistivity greater than 5.0E+13 Ohm-cm, when moisture treated for 1K hours at a temperature of 85° C. and 85% relative humidity. The aromatic polyamide may have an overall aromaticity greater than 31 or more preferably greater than 35%. Some embodiments may also comprise PA6 in an amount from 0 wt % to 10 wt %. The polymer composition comprises from 25 wt % to 95 wt % aromatic polyamide, based on the total weight of the polymer composition. In one embodiment, heat stabilizer is a hindered phenol such as N,N'-hexamethylene bis[3-(3,5-dit-butyl-4-hydroxyphenyl) propionamide. In one embodiment, the lubricant is a montanate.

In some embodiments, the disclosure relates to a polyamide composition comprising (from 25 wt % to 95 wt % of) an aromatic polyamide comprising terephthalic units and isophthalic units (and optionally adipic acid units), e.g., PA6T/DT, 6I/6T, 6T/6I/66, or 6T/66/6I, or combinations thereof or PA6T/6I/66 or PA6T/66/6I or a combination thereof, and having an overall aromaticity greater than 20%, e.g., greater than 35%; a heat stabilizer, e.g., a hindered phenol and/or N,N'-hexamethylene bis[3-(3,5-dit-butyl-4- hydroxyphenyl)propionamide; an optional lubricant, e.g., a montanate, wherein the polymer composition demonstrates a tensile strength (dry-as-molded) greater than 146 MPa, measured at 23° C. and a volume resistivity greater than 1.0E+10 Ohm-cm, as measured via IEC 62631 and at 150° C. and/or a tensile strength greater than 85 MPa when moisture treated for 1000 hours at a temperature of 85° C. and 85% relative humidity, and a volume resistivity greater than 5.0E+13 Ohm-cm, when moisture treated for 1000 hours at a temperature of 85° C. and 85% relative humidity. The difference in content of terephthalic units and isophthalic units, combined, and adipic units (and optionally caprolactam) may range from 30 to 100. The aromatic polyamide may comprise from 35 wt % to 100 wt % terephthalic units and/or from 10 wt % to 70 wt % isophthalic units, based on the total weight of the aromatic polyamide, and optionally from 0 wt % to 10 wt % of PA6.

In some embodiments, the disclosure relates to a polymer composition comprising: one or more of a 6T/DT copolymer; a 6I/6T copolymer comprising terephthalic units and isophthalic units (and optionally caprolactam units); and a terpolymer comprising terephthalic units, isophthalic units, and adipic acid units, having an overall aromaticity greater than 25%, e.g., greater than 30%. The polymer composition further comprises a heat stabilizer; an optional lubricant, wherein the polymer composition demonstrates a tensile strength a tensile strength (dry-as-molded) greater than 146 MPa, measured at 23° C. and a volume resistivity greater than 1.0E+10 Ohm-cm, as measured via IEC 62631 and at 150° C.

In some embodiments, the disclosure relates to a polymer composition comprising a 6I/6T copolymer comprising: from 25 wt % to 45 wt % from terephthalic units; and from 55 wt % to 75 wt % isophthalic units, based on the total weight of all units; from 0 wt % to 20 wt % of a caprolactam-based polyamide; a heat stabilizer; and an optional lubricant.

In some embodiments, the disclosure relates to a polymer composition comprising: a 6T/6I/66 terpolymer comprising: from 50 wt % to 65 wt % terephthalic units; from 20 wt % to 30 wt % isophthalic units; and from 10 wt % to 25 wt % adipic acid units, based on the total weight of all units; and from 0 wt % to 20 wt % of a caprolactam-based polyamide; a heat stabilizer; an optional lubricant.

In some embodiments, the disclosure relates to a polymer composition comprising: a 6T/66/6I terpolymer comprising: from 45 wt % to 60 wt % terephthalic units; from 12 wt % to 27 wt % isophthalic units; and from 25 wt % to 40 wt % adipic acid units, based on the total weight of all units; and from 0 wt % to 20 wt % of a caprolactam-based polyamide; a heat stabilizer; an optional lubricant.

DETAILED DESCRIPTION

Conventional polyamide compositions often include heat stabilizer packages that attempt to improve high temperature heat aging performance. Although the art is replete with examples of heat stabilized compositions, most, if not all, of these compositions fail to achieve the very high heat age performance that is required by prolonged high temperature applications such as automotive or electrical/electronic applications. Further, the addition of some heat stabilizers often detracts from other performance features, e.g., processability or electrical properties, e.g., dielectric strength and volume resistivity, and/or may add other unwanted compounds/elements to the polymer compositions, e.g., excess halogens. Thus, it has been difficult, however, for conventional polyamide compositions to achieve improvements in specific combinations of performance features.

The inventors have surprisingly discovered that certain polymers (polymers, copolymers, and/or terpolymers), optionally employed in particular types, amounts, and ratios (as described herein), provide for surprising improvements in mechanical performance, e.g., elongation, tensile, and/or impact properties, at higher temperatures. The inventors have further found that the materials disclosed herein may also surprisingly exhibit improvements in electrical properties, such as volume resistivity and/or dielectric strength, particularly under demanding conditions, such as increased moisture and elevated temperatures. This is demonstrated over a long term at higher temperatures. It has been found that, in many cases, aromaticity contributes to significant and surprising improvements in the aforementioned performance properties. In some cases, these polymers, are utilized with specific types, amounts, and ratios of one or more other additives, which results in synergistic compositions having the aforementioned performance benefits. These polymer compositions advantageously maintain performance features, e.g., processability, while providing for the aforementioned improvements in mechanical and/or electrical properties. Stated another way, the polymer compositions disclosed herein beneficially demonstrate an unexpected balance of performance factors previously not achieved.

In particular, when polymer aromaticity is kept within a certain range, e.g., from 31% to 50%, the synergistic balance of properties is achieved, including both dielectric strength and volume resistivity. In contrast, conventional polymer compositions that do not focus on aromaticity (or that may have low aromaticity) and repeat unit content, while possibly achieving mechanical performance, are unable achieve the other accompanying properties, e.g., dielectric strength and/or volume resistivity performance, along with processability advantages, especially when heat aged. Moreover, for the disclosed compositions, unexpected performance in high moisture environments was also demonstrated, e.g., dielectric strength, volume resistivity, tensile properties, and impact properties at 85° C./85% relative humidity for 1000+ hours.

Compositions

Aromatic Copolymer (with Particular Aromaticity)

In some embodiments, the aromatic polyamide has a high aromaticity, e.g., greater than 30% or greater than 31%. This aromaticity has been found to be particularly advantageous in providing for improved electrical properties, e.g., dielectric strength and volume resistivity. Without being bound by theory, it is postulated that the aromatic, e.g., 6T and/or 6I, content advantageously contributes to moisture absorption-related and/or glass transition-related characteristics that lead to higher dielectric strength and volume resistivity, especially under demanding conditions, such as elevated temperatures and increased moisture levels. Some conventional highly aliphatic formulations may perform suitably at lower temperatures, but these formulations have been found to suffer from retention issues at higher temperatures, e.g., 125° C. or 150° C., or when exposed to moisture.

The aromatic polyamide may vary widely in structure, and it generally has a higher aromaticity. In some embodiments, the aromatic polyamide comprises aromatic repeat units, e.g., terephthalic repeat units and/or isophthalic repeat units. In some cases, the aromatic polyamide has an overall aromaticity greater than 20%, e.g., greater than 25%, greater than 30%, greater than 31%, greater than 32%, greater than 35%, greater than 39%, greater than 40%, greater than 42%, greater than 45%, or greater than 50%. In terms of ranges, the aromatic polyamide may have an overall aromaticity ranging from 20% to 50%, e.g., from 30% to 50%, from 31% to 50%, from 32% to 50%, from 32% to 50%, from 35% to 50%, In terms of upper limits, the aromatic polyamide may have an overall aromaticity less than 50%, e.g., less than 49%, less than 45%, less than 40%, or less than 35%.

Advantageously, it has been found that the use of the aforementioned aromatic polyamides provides unexpected processing benefits. For example, when employing the aromatic polyamides, more molding options are possible, e.g., water molding, steam molding, etc. In contrast, the use of different polyamides has been found to require oil molding, which is generally more expensive and troublesome. In some cases, polyamides with lower 6T and/or 6I content and/or higher 66 and/or caprolactam content unexpectedly allow for water molding or steam molding. In some cases, the disclosed molding processes advantageously do not employ process-unfriendly oil molding techniques.

The aromatic polyamide comprises hexamethylene diamine (HMD)—terephthalic acid (6T) units in an amount ranging from 20 wt % to 100 wt %, based on the total weight of the aromatic polyamide, e.g., from 35 wt % to 100 wt %, from 50 wt % to 100 wt %, from 45 wt % to 75 wt %, from 35 wt % to 60 wt %, from 40 wt % to 55 wt %, from 45 wt % to 55 wt %, from 45 wt % to 50 wt %, or from 50 wt % to 70 wt %. In terms of upper limits, the aromatic polyamide may comprise less than 100 wt % 6T units, e.g., less than 90 wt %, less than 75 wt %, less than 70 wt %, less than 65, less than 61 wt %, less than 60 wt %, less than 55 wt %, less than 50 wt %, less than 45 wt %, less than 40 wt %, or less than 35 wt %. In terms of lower limits, the aromatic polyamide may comprise greater than 34 wt % 6T, e.g., greater than 35 wt %, greater than 40 wt %, greater than 45 wt %, greater than 50 wt %, greater than 55 wt %, or greater than 59 wt %.

The aromatic polyamide comprises HMD—isophthalic acid (6I) units in an amount ranging from 10 wt % to 75 wt %, based on the total weight of the aromatic polyamide, e.g., from 10 wt % to 70 wt %, from 15 wt % to 65 wt %, from 10 wt % to 35 wt %, or from 15 wt % to 35 wt %. In terms of upper limits, the aromatic polyamide may comprise less than 75 wt % 6I units, e.g., less than 70 wt %, less than 65 wt %, less than 50 wt %, less than 45 wt %, less than 40 wt %, less than 35 wt %, less than 30 wt %, or less than 25 wt %. In terms of lower limits, the aromatic polyamide may comprise greater than 10 wt % 6I units, e.g., greater than 15 wt %, greater than 17 wt %, greater than 20 wt %, greater than 25 wt %, greater than 30 wt %, greater than 40 wt %, greater than 50 wt %, or greater than 60 wt %.

The aromatic polyamide comprises 6 units (caprolactam) and/or 66 units (HMD—adipic acid) in an amount ranging from 5 wt % to 85 wt %, based on the total weight of the aromatic polyamide, e.g., from 5 wt % to 50 wt %, from 5 wt % to 35 wt %, from 10 wt % to 40 wt %, from 15 wt % to 35 wt % or from 20 wt % to 35 wt %. In terms of upper limits, the aromatic polyamide may comprise less than 85 wt % 6 units and/or 66 units, e.g., less than 75 wt %, less than 70 wt %, less than 65 wt %, less than 60 wt %, less than 50 wt %, less than 45 wt %, less than 40 wt %, less than 35 wt %, less than 30 wt %, less than 25 wt %, less than 20 wt %, or less than 15 wt %. In terms of lower limits, the aromatic polyamide may comprise greater than 0 wt % 6 units and/or 66 units, e.g., greater than 5 wt %, greater than 10 wt %, greater than 15 wt %, greater than 20 wt %, greater than 25 wt %, greater than 30 wt %, greater than 34 wt %, or greater than 35 wt %.

Importantly, the inventors have found that the aforementioned performance benefits are particularly evident when the content of 6 units (caprolactam) and/or 66 units (HMD—adipic acid) is (equal to or) greater than 15 wt %. In some cases, when a terpolymer is employed and the content of 6 units and/or 66 units is as discussed, the synergistic performance benefits are achieved. It is postulated that the notable amounts of 6 or 66 may contribute to the electrical performance, reduce the melting point and glass transition temperature (thus making water/steam moldability more feasible), while not having an adverse effect on mechanical performance.

In some embodiments, the difference in content (based on weight) of terephthalic units and isophthalic units, combined, and caprolactam and/or adipic units ranges from 20 to 100, e.g., from 20 to 80, from 25 to 75, from 30 to 100, from 30 to 70, from 30 to 75, from 60 to 100, from 30 to 60, or from 40 to 60. In terms of lower limits, the difference in content (based on weight) of terephthalic units and isophthalic units, combined, and caprolactam and/or adipic units, combined, may be greater than 20, e.g., greater than 25, greater than 29, greater than 30, greater than 35, greater than 40, greater than 45, greater than 50, greater than 60, greater than 70, greater than 80, greater than 90, greater than 95, or greater than 99. In some cases, where 6 and/or 66 content is low or non-existent, the difference in content of terephthalic units and isophthalic units, combined, and adipic units may be equal to the total content of terephthalic units and isophthalic units (there are no adipic units to subtract). In terms of upper limits, the difference in content of terephthalic units and isophthalic units, combined, and adipic units may be less than 100, e.g., less than 85, less than 70, or less than 60.

In one embodiment, the polyamide is a terpolymer having 6T, 6I, and 66 units. The terpolymer may comprise 6T units in an amount ranging from 45 wt % to 75 wt %, e.g., from 47 wt % to 72 wt %, from 50 wt % to 70 wt %, from 52 wt % to 68 wt %, from 55 wt % to 65 wt %, or from 57 wt % to 62 wt %. In terms of lower limits, the terpolymer may comprise greater than 45 wt % 6T units, e.g., greater than 47 wt %, greater than 50 wt %, greater than 52 wt %, greater than 55 wt %, or greater than 57 wt %. In terms of upper limits, the terpolymer may comprise less than 75 wt % 6T units, e.g., less than 72 wt %, less than 70 wt %, less than 68 wt %, less than 65 wt %, or less than 62 wt %. The terpolymer may comprise 6I units in an amount ranging from 10 wt % to 40 wt %, e.g., from 12 wt % to 38 wt %, from 15 wt % to 35 wt %, from 17 wt % to 32 wt %, from 20 wt % to 30 wt %, or from 22 wt % to 28 wt %. In terms of lower limits, the terpolymer may comprise greater than 10 wt % 6I units, e.g., greater than 12 wt %, greater than 15 wt %, greater than 17 wt %, greater than 20 wt %, or greater than 22 wt %. In terms of upper limits, the terpolymer may comprise less than 40 wt % 6I units, e.g., less than 38 wt %, less than 35 wt %, less than 32 wt %, less than 30 wt %, or less than 28 wt %. The terpolymer may comprise 66 units in an amount ranging from 5 wt % to 35 wt %, e.g., from 7 wt % to 32 wt %, from 10 wt % to 30 wt %, from 12 wt % to 28 wt %, from 10 wt % to 25 wt %, from 15 wt % to 25 wt %, or from 17 wt % to 23 wt %. In terms of lower limits, the terpolymer may comprise greater than 5 wt % 66 units, e.g., greater than 7 wt %, greater than 10 wt %, greater than 12 wt %, greater than 15 wt %, or greater than 17 wt %. In terms of upper limits, the terpolymer may comprise less than 35 wt % 66 units, e.g., less than 32 wt %, less than 30 wt %, less than 28 wt %, less than 25 wt %, or less than 23 wt %.

In one embodiment, the terpolymer may comprise 6T units in an amount ranging from 38 wt % to 68 wt %, e.g., from 40 wt % to 65 wt %, from 42 wt % to 62 wt %, from 45 wt % to 60 wt %, from 48 wt % to 57 wt %, or from 50 wt % to 55 wt %. In terms of lower limits, the terpolymer may comprise greater than 38 wt % 6T units, e.g., greater than 40 wt %, greater than 42 wt %, greater than 45 wt %, greater than 48 wt %, or greater than 50 wt %. In terms of upper limits, the terpolymer may comprise less than 68 wt % 6T units, e.g., less than 65 wt %, less than 62 wt %, less than 60 wt %, less than 57 wt %, or less than 55 wt %. In one embodiment, the terpolymer may comprise 6I units in an amount ranging from 2 wt % to 37 wt %, e.g., from 5 wt % to 35 wt %, from 7 wt % to 32 wt %, from 10 wt % to 30 wt %, from 12 wt % to 27 wt %, or from 15 wt % to 25 wt %. In terms of lower limits, the terpolymer may comprise greater than 2 wt % 6I units, e.g., greater than 5 wt %, greater than 7 wt %, greater than 10 wt %, greater than 12 wt %, or greater than 15 wt %. In terms of upper limits, the terpolymer may comprise less than 37 wt % 6I units, e.g., less than 35 wt %, less than 32 wt %, less than 30 wt %, less than 27 wt %, or less than 25 wt %. In one embodiment, the terpolymer may comprise 66 units in an amount ranging from 7 wt % to 47 wt %, e.g., from 10 wt % to 45 wt %, from 12 wt % to 42 wt %, from 15 wt % to 40 wt %, from 25 wt % to 40 wt % from 17 wt % to 37 wt %, or from 20 wt % to 35 wt %. In terms of lower limits, the terpolymer may comprise greater than 7 wt % 66 units, e.g., greater than 10 wt %, greater than 12 wt %, greater than 15 wt %, greater than 17 wt %, or greater than 20 wt %. In terms of upper limits, the terpolymer may comprise less than 47 wt % 66 units, e.g., less than 45 wt %, less than 42 wt %, less than 40 wt %, less than 37 wt %, or less than 35 wt %.

In one embodiment, the polyamide is a copolymer having 6T and 6I units. The terpolymer may comprise 6T units in an amount ranging from 20 wt % to 50 wt %, e.g., from 22 wt % to 47 wt %, from 25 wt % to 45 wt %, from 27 wt % to 42 wt %, from 30 wt % to 40 wt %, or from 32 wt % to 38 wt %. In terms of lower limits, the copolymer may comprise greater than 20 wt % 6T units, e.g., greater than 22 wt %, greater than 25 wt %, greater than 27 wt %, greater than 30 wt %, or greater than 32 wt %. In terms of upper limits, the copolymer may comprise less than 50 wt % 6T units, e.g., less than 47 wt %, less than 45 wt %, less than 42 wt %, less than 40 wt %, or less than 38 wt %. The copolymer may comprise 6I units in an amount ranging from 50 wt % to 80 wt %, e.g., from 52 wt % to 77 wt %, from 55 wt % to 75 wt %, from 57 wt % to 72 wt %, from 60 wt % to 70 wt %, or from 62 wt % to 68 wt %. In terms of lower limits, the copolymer may comprise greater than 50 wt % 6I units, e.g., greater than 52 wt %, greater than 55 wt %, greater than 57 wt %, greater than 60 wt %, or greater than 62 wt %. In terms of upper limits, the terpolymer may comprise less than 80 wt % 6I units, e.g., less than 77 wt %, less than 75 wt %, less than 72 wt %, less than 70 wt %, or less than 68 wt %.

In some embodiments, the polyamide is a copolymer. The copolymer may have the contents and aromaticities mentioned herein. For example, the aromatic polyamide may comprise 6T/DT or 6I/6T or a combination thereof. 6T/DT has a branched diamine component, e.g., branched HMD, or 1,5-diamino-2-methylpentane.

In some embodiments, the content of 6T units is greater than (or equal to) the content of the 66 units or the 6I units, or the combination of the 66 and 6I units, combined. In some embodiments, the content of 6T units is at least 1% greater than the content of the 66 units or the 6I units, or the combination of the 66 and 6I units, combined, e.g., at least 3% greater, at least 5% greater, at least 7% greater, at least 10% greater, at least 12% greater, at least 15% greater, at least 17% greater, at least 20% greater, at least 25% greater, at least 30% greater, at least 40% greater, at least 50% greater, at least 75% greater, or at least 100% greater.

In some cases, the ratio of the terephthalic to isophthalic content of the aromatic polyamide can range, for example, from 0.1 to 10, e.g., from 0.1 to 5, from 0.2 to 5, from 0.1 to 1, from 0.2 to 0.7, from 0.2 to 0.8, from 1.0 to 3.5, from 2.0 to 3.5, from 0.3 to 3, from 3.5 to 10, from 2 to 7, or from 0.4 to 3.5. In terms of upper limits, the ratio of the terephthalic to isophthalic content of the aromatic polyamide, may be less than 10, e.g., less than 7, less than 5, less than 4, less than 3.5, less than 2, less than 1, or less than 0.5. In terms of lower limits, the ratio of the terephthalic to isophthalic content of the aromatic polyamide, may be greater than 0.1, e.g., greater than 0.2, greater than 0.5, greater than 0.7, greater than 1, greater than 1.5, greater than 2, greater than 2.5, or greater than 3.0. It has been discovered that keeping terephthalic content within these molar ranges contributes to the aforementioned performance benefits.

Exemplary aromatic polyamides include, but are not limited to, PA6T/6I/66 terpolymer. The PA6T/6I/66 terpolymer may have 6T, 6I, and PA66 unit content as described above and herein. In some cases, the PA6T/6I/66 terpolymer comprises from 45 wt % to 75 wt % (from 45 wt % to 60 wt % or from 50 wt % to 65 wt %) 6T units; from 15 wt % to 65 wt % (from 15 wt % to 30 wt % or from 15 wt % to 35 wt %) 6I units, and from 10 wt % to 40 wt % (from 15 wt % to 35 wt %) PA66 units.

Other exemplary aromatic polyamides may include PA-4T/41; PA-4T/6I; PA-5T/51; PA-6,6/6T; PA-6T/6I; PA-6T/6I/6; PA-6T/6; PA-6T/6I/66; PA-6T/66; PA-6I/6 T, PA-6T/6; PA-6,6/6I/6; PA-6I/6; or 6T/6116, PA-6T/610; PA-10T/612; PA-10T/106; PA-6T/612; PA-6T/10T; PA-6T/10I; PA-9T; PA-10T; PA-12T; PA-10T/10I; PA-10T/12; PA-10T/11; PA-6T/9T; PA-6T/12T; PA-6T/10T/6I; PA-6T/6116; PA-6T/6I/12; MPMD-T; MPMD-I; or polyamide blends with MPMD-T/MPMD-I, e.g., DT/DI blends; or combinations thereof.

The number of distinct species of aromatic polyamide in the provided composition can be, for example, one, two, three, four, five, six, seven, eight, nine, ten, or more than ten. In some embodiments, the one or more aromatic polyamide of the composition include a partially aromatic polyamide. In some embodiments, each aromatic polyamide of the composition is a partially aromatic polyamide. In some embodiments, the one or more aromatic polyamides include an amorphous co-polyamide. In some embodiments, each aromatic polyamide is an amorphous co-polyamide.

One exemplary commercial polyamide product is Amodel A-1006 from Solvay S.A.

In some embodiments, the concentration of the aromatic polyamide ranges from 25 wt % to 95 wt %, based on the total weight of the polymer composition, e.g., from 35 wt % to 85 wt %, from 40 wt % to 75 wt %, from 25 wt % to 50 wt %, from 30 wt % to 50 wt %, from 32 wt % to 50 wt %, from 35 wt % to 50 wt %, from 40 wt % to 50 wt %, from 45 wt % to 50 wt %, from 47 wt % to 50 wt %, from 50 wt % to 70 wt %, from 60 wt % to 80 wt %, from 55 wt % to 65 wt %, or from 65 wt % to 75 wt %. In terms of upper limits, the concentration of the polyamide may be less than 95 wt %, e.g., less than 85 wt %, less than 80 wt %, less than 75 wt %, less than 70 wt %, less than 65 wt %, less than 60 wt %, less than 55 wt %, less than 51 wt %, less than 50 wt %, less than 45 wt %, less than 40 wt %, less than 35 wt %, less than 32 wt %, or less than 30 wt %. In terms of lower limits, the concentration of the polyamide may be greater than 25 wt %, e.g., greater than 30 wt %, greater than 32 wt %, greater than 35 wt %, greater than 40 wt %, greater than 45 wt %, greater than 49 wt %, greater than 50 wt %, greater than 55 wt %, greater than 60 wt %, greater than 65 wt %, or greater than 70 wt %. Lower concentrations, e.g., less than 25 wt %, are also contemplated.

The aromatic polyamide may have a melting point ranging from 200° C. to 400° C., e.g., from 270° C. to 340° C., from 275° C. to 330° C., from 280° C. to 335° C., from 285° C. to 320° C., from 250° C. to 350° C., from 275° C. to 325° C., from 260° C. to 325° C., from 270° C. to 320° C., from 275° C. to 320° C., from 280° C. to 320° C., from 285° C. to 315° C., from 290° C. to 310° C., or from 290° C. to 320° C.

In terms of upper limits, the aromatic polyamide may have a melting point less than 400° C., e.g., less than 375° C., less than 365° C., less than 350° C., less than 340° C., less than 330° C., less than 325° C., less than 320° C., less than 315° C., less than 310° C., less than 300° C., less than 290° C., or less than 285° C. In terms of lower limits, the aromatic polyamide may have a melting point greater than 200° C., e.g., greater than 250° C., greater than 265° C., greater than 270° C., greater than 275° C., greater than 280° C., greater than 285° C., greater than 290° C., greater than 295 C., greater than 300° C., greater than 305° C., or greater than 310° C. In some cases, the polyamide is amorphous, e.g., 6I/6T, and does not have a per se melting point.

The aromatic polyamide may have a glass transition temperature, $T_g$, ranging from 25° C. to 225° C., e.g., from 50° C. to 200° C., from 75° C. to 175° C., from 100° C. to 175° C., from 125° C. to 175° C., from 125° C. to 150° C., from 85° C. to 130° C., from 90° C. to 125° C., from 90° C. to 120° C., from 90° C. to 115° C., from 90° C. to 110° C., or from 95° C. to 110° C.

In terms of upper limits, the aromatic polyamide may have a $T_g$ less than 225° C., e.g., less than 200° C., less than 190° C., less than 180° C., less than 175° C., less than 150° C., less than 140° C., less than 130° C., less than 125° C., less than 120° C., less than 110° C., less than 105° C., less than 100° C., less than 95° C., less than 93° C., or less than 92° C. In terms of lower limits, the aromatic polyamide may have a $T_g$ greater than 25° C., e.g., greater than 50° C., greater than 65° C., greater than 75° C., greater than 85° C., greater than 90° C., greater than 95° C., greater than 100° C., greater than 105° C. greater than 110° C., or greater than 115° C.

As used herein, "greater than" and "less than" limits may also include the number associated therewith. Stated another way, "greater than" and "less than" may be interpreted as "greater than or equal to" and "less than or equal to." It is contemplated that this language may be subsequently modified in the claims to include "or equal to." For example, "greater than 4.0" may be interpreted as, and subsequently modified in the claims as "greater than or equal to 4.0."

In some cases, the chemical characteristics of the polymer composition (or in one or more of the components thereof) contributes, at least in part, to the performance improvements. The disclosed compositions and parts may be characterized by the chemical characteristics, irrespective of the compositional make-up, e.g., the individual polyamides, of the polymer composition. In some cases, the compositions comprise a low $T_g$ polymer with a $T_g$ from 100° C. to 200° C. or from 0° C. to 84° C. or and a high $T_g$ polymer with a $T_g$ from 0° C. to 160° C. or from 85° C. to 130° C.

Additional Polymer (PA6) Content

In some cases, the polyamide composition comprises an additional polyamide (in addition to the aromatic copolymer. The additional polyamide may vary widely and may include any polyamide that does not have PA6T, PA6I, and PA66 content. In some cases, the polyamide composition comprises a caprolactam-containing polymer, e.g., PA6. Advantageously, the inventors have found that the addition of some amounts of these polymers provides for additional synergistic property improvements, e.g., high temperature performance and/or processing improvements.

In some embodiments, the concentration of the additional polyamide ranges from 0 wt % to 10 wt %, based on the total weight of the polymer composition, e.g., from 0.01 wt % to 8 wt %, from 0.05 wt % to 7 wt %, from 0.1 wt % to 5 wt %, from 0.1 wt % to 3 wt %, from 0.1 wt % to 2 wt %, or from 0.1 wt % to 1 wt %. In terms of upper limits, the concentration of the additional polyamide may be less than 10 wt %, e.g., less than 9 wt %, less than 8 wt %, less than 7 wt %, less than 6 wt %, less than 5 wt %, less than 4 wt %, less than 3 wt %, less than 2 wt %, or less than 1 wt %. In terms of lower limits, the concentration of the additional polyamide may be greater than 0.01 wt %, e.g., greater than 0.05 wt %, greater than 0.07 wt %, greater than 0.1 wt %, greater than 0.15 wt %, greater than 0.2 wt %, greater than 0.3 wt %, greater than 0.4 wt %, or greater than 0.5 wt %.

As used herein, the terms "PA66," "nylon 66," and "polyamide 66" refer to a homopolymer prepared from hexamethylene diamine and adipic acid monomer subunits. A PA66 polyamide may be a polyamide that contains a significant portion of PA66 units in the polymer backbone, e.g., at least 5 wt %, at least 10 wt %, at least 20 wt %, at least 30 wt %, at least 40 wt %, at least 50 wt %, at least 60 wt %, at least 70 wt %, at least 80 wt % or at least 90 wt. As used herein, the terms "PA6," "nylon 6," and "polyamide 6" refer to a homopolymer prepared from caprolactam monomer subunits. As used herein, the terms "PA66/6," "nylon 66/6," and "polyamide 66/6" refer to a copolymer prepared from hexamethylene diamine and adipic acid monomer subunits and also incorporating caprolactam monomer subunits. As used herein, the terms "PA66/6I," "nylon 66/6I," and "polyamide 66/6I" refer to a copolymer prepared from hexamethylene diamine and adipic acid monomer subunits and also incorporating isophthalic acid monomer subunits.

Heat Stabilizers

As noted above, in some cases the aforementioned aromatic polyamides may be employed along with particular heat stabilizers and lubricants. These combinations of components have been found to synergistically result in polymer compositions having, inter alia, an improved (heat aged) tensile/impact performance along with dielectric strength and volume resistivity.

In some embodiments, the polymer compositions comprise a heat stabilizer, e.g., a phenolic and/or amine stabilizer. In particular, some hindered phenol stabilizers have been found to work unexpectedly well with the aromatic polyamides to achieve the performance features noted herein. Examples include N,N'-hexamethylene-bis-3-(3,5-di-tert-butyl-4-hydroxyphenyl)-propionamide, bis-(3,3-bis-(4'-hydroxy-3'-tert-butylphenyl)-butanoic acid)-glycol ester, 2,1'-thioethylbis-(3-(3,5-di-tert-butyl-4-hydroxyphenyl)-propionate, 4-4'-butylidene-bis-(3-methyl-6-tert-butylphenol), triethyleneglycol-3-(3-tert-butyl-4-hydroxy-5-methylphenyl)-propionate or mixtures these stabilizers. In some cases, synergistic results have been found with N,N'-hexamethylene bis[3-(3,5-dit-butyl-4-hydroxyphenyl)propionamide. Exemplary commercial products include, but are not limited to, Lowinox® HD98 from Addivant, Irganox 1098 from BASF (phenol).

Other commercial products include the AuerStab line of products, e.g., HPA 100, HPA 110, and/or HPA 120 from Treibacher Industrie AG.

In some embodiments, the heat stabilizer may be selected from the group consisting of phenolics, amines, polyols, and combinations thereof.

For example, the heat stabilizer package may comprise amine stabilizers, e.g., secondary aromatic amines. Examples include adducts of phenylene diamine with acetone (Naugard A), adducts of phenylene diamine with linolene, Naugard 445, N,N'-dinaphthyl-p-phenylene diamine, N-phenyl-N'-cyclohexyl-p-phenylene diamine, N,N'-diphenyl-p-phenylene diamine or mixtures of two or more thereof.

Other examples include heat stabilizers based on sterically hindered phenols. Examples include N,N'-hexamethylene-bis-3-(3,5-di-tert-butyl-4-hydroxyphenyl)-propionamide, bis-(3,3-bis-(4'-hydroxy-3'-tert-butylphenyl)-butanoic acid)-glycol ester, 2,1'-thioethylbis-(3-(3,5-di-tert-butyl-4-hydroxyphenyl)-propionate, 4-4'-butylidene-bis-(3-methyl-6-tert-butylphenol), triethyleneglycol-3-(3-tert-butyl-4-hydroxy-5-methylphenyl)-propionate or mixtures these stabilizers.

Further examples include phosphites and/or phosphonites. Specific examples include phosphites and phosphonites are triphenylphosphite, diphenylalkylphosphite, phenyldialkylphosphite, tris(nonylphenyl)phosphite, trilaurylphosphite, trioctadecylphosphite, di stearylpentaerythritoldiphosphite, tris(2,4-di-tert-butylphenyl)phosphite, diisodecylpentaerythritoldiphosphite, bis(2,4-di-tert-butylphenyl) pentaerythritoldiphosphite, bis(2,6-di-tert-butyl-4-methylphenyl)pentaerythritoldiphosphite, diisodecyloxypentaerythritoldiphosphite, bis(2,4-di-tert-butyl-6-methylphenyl)pentaerythritoldiphosphite, bis(2,4,6-tris-(tert-butylphenyl)pentaerythritoldiphosphite, tristearylsorbitoltriphosphite, tetrakis(2,4-di-tert-butylphenyl)-4,4'-biphenylenediphosphonite, 6-isooctyloxy-2,4,8,10-tetratert-butyl-12H-dibenzo[d,g]-1,3,2-dioxaphosphocine, 6-fluoro-2,4,8,10-tetra-tert-butyl-12-methyl-dibenzo[d,g]-1,3,2-dioxaphosphocine, bis(2,4-di-tert-butyl-6-methylphenyl)methylphosphite and bis(2,4-di-tert-butyl-6-methylphenyl)ethylphosphite. Particularly preferred are tris[2-tert-butyl-4-thio(2'-methyl-4'-hydroxy-5'-tert-butyl)-phenyl-5-methyl]phenylphosphite and tris(2,4-di-tert-butylphenyl) phosphite (Hostanox® PAR24: commercial product of the company Clariant, Basel or Orgafos 168 from BASF).

In some cases, the heat stabilizer may include a radical scavenger, many of which are known. Primary antioxidants react with peroxy and alkoxy radicals acting as "radical" scavengers, and this interaction has been found to be advantageous. Secondary antioxidants react with hydroperoxides to yield non-radical products. Hydrolytically stable phosphites protect both the polymer and the primary antioxidant from oxidation.

In some embodiments, the heat stabilizer comprises a copper-based stabilizer. Without being bound by theory, it is believed that the combination of the activation temperatures of the cerium-based heat stabilizer and the copper-based stabilizer unexpectedly provide for thermooxidative stabilization at particularly useful ranges, e.g., 190° C. to 220° C. or 190° C. to 210° C. This particular range has been shown to present a performance gap when conventional stabilizer packages are employed. By utilizing the combination of the copper-based compound and the cerium-based compound in the amounts discussed herein thermal stabilization is unexpectedly achieved.

By way of non-limiting example, the copper-based heat stabilizer may comprise compounds of mono- or bivalent copper, such as salts of mono- or bivalent copper with inorganic or organic acids or with mono- or bivalent phenols, the oxides of mono- or bivalent copper, or complex compounds of copper salts with ammonia, amines, amides, lactams, cyanides or phosphines, and combinations thereof. In some preferred embodiments, the copper-based heat stabilizer may comprise salts of mono- or bivalent copper with hydrohalogen acids, hydrocyanic acids, or aliphatic carboxylic acids, such as copper(I) chloride, copper(I) bromide, copper(I) iodide, copper(I) cyanide, copper(II) oxide, copper(II) chloride, copper(II) sulfate, copper(II) acetate, or copper (II) phosphate. Preferably, the copper-based heat stabilizer is copper iodide and/or copper bromide. The heat stabilizer may be employed with a halide additive discussed below. Copper stearate, as a second heat stabilizer (not as a stearate additive) is also contemplated. In some cases, when electrical applications are the end use, bound copper heat stabilizers may be employed.

In some embodiments, the concentration of the heat stabilizers ranges from 0 wt % to 10 wt %, based on the total weight of the polymer composition, e.g., from 0.01 wt % to 8 wt %, from 0.05 wt % to 7 wt %, from 0.05 wt % to 5 wt %, from 0.05 wt % to 3 wt %, from 0.05 wt % to 2 wt %, from 0.05 wt % to 1 wt %, from 0.1 wt % to 1 wt %, or from 0.1 wt % to 0.5 wt %. In terms of upper limits, the concentration of the heat stabilizers may be less than 10 wt %, e.g., less than 9 wt %, less than 8 wt %, less than 7 wt %, less than 6 wt %, less than 5 wt %, less than 4 wt %, less than 3 wt %, less than 2 wt %, less than 1 wt %, or less than 0.5 wt %. In terms of lower limits, the concentration of the heat stabilizers may be greater than 0.01 wt %, e.g., greater than 0.05 wt %, greater than 0.07 wt %, greater than 0.1 wt %, greater than 0.15 wt %, or greater than 0.2 wt %.

In some embodiments, when multiple heat stabilizers are used, the polyamide composition comprises a first heat stabilizer in an amount ranging from 0 wt % to 5.0 wt %, e.g., from 0.01 wt % to 5.0 wt %, from 0.01 wt % to 4.0 wt %, from 0.02 wt % to 3.0 wt %, from 0.03 to 2.0 wt %, from 0.03 wt % to 1.0 wt %, from 0.04 wt % to 1.0 wt %, from 0.05 wt % to 0.5 wt %, from 0.05 wt % to 0.2 wt %, or from 0.07 wt % to 0.1 wt %. In terms of lower limits, the polyamide composition may comprise greater than 0.01 wt % first heat stabilizer, e.g., greater than 0.02 wt %, greater than 0.03 wt %, greater than 0.035 wt %, greater than 0.04 wt %, greater than 0.05 wt %, greater than 0.07 wt %, or greater than 0.1 wt %. In terms of upper limits, the polyamide composition may comprise less than 5.0 wt % first heat stabilizer, e.g., less than 4.0 wt %, less than 3.0 wt %, less than 2.0 wt %, less than 1.0 wt %, less than 0.5 wt %, less than 0.2 wt %, less than 0.1 wt %, less than 0.05 wt %, or less than 0.035 wt %. In addition, to the first heat stabilizer, the polyamide composition may comprise a second heat stabilizer being different from the first heat stabilizer. In some embodiments, the polyamide composition comprises the second heat stabilizer in an amount ranging 0.1 wt % to 2 wt %, e.g., from 0.1 wt % to 0.6 wt %, from 0.13 wt % to 0.81 wt %, from 0.18 wt % to 1.1 wt %, from 0.25 wt % to 1.5 wt %, or from 0.33 wt % to 2 wt %. In terms of upper limits, the second heat stabilizer concentration can be less than 2 wt %, e.g., less than 1.5 wt %, less than 1.1 wt %, less than 0.81 wt %, less than 0.6 wt %, less than 0.45 wt %, less than 0.33 wt %, less than 0.25 wt %, less than 0.18 wt %, or less than 0.13 wt %. In terms of lower limits, the second heat stabilizer concentration can be greater than 0.1 wt %, e.g., greater than 0.13 wt %, greater than 0.18 wt %, greater than 0.25 wt %, greater than 0.33 wt %, greater than 0.45 wt %, greater than 0.6 wt %, greater than 0.81 wt %, greater than 1.1 wt %, or greater than 1.5 wt %.

Flame Retardant

Generally, non-halogenated flame retardants are used due to a desire to avoid the potentially adverse environmental impact of halogenated flame retardants. Halogenated flame retardants are contemplated as well.

Exemplary non-halogenated flame retardants include phosphorus- or melamine-containing flame retardants. Melamine flame retardants are known in the art and include melamine phosphates and melamine cyanurate. Phosphate esters are especially suitable for use. Such compounds include, for example, alkyl and aryl esters of phosphoric acid such as trimethyl phosphate, triethyl phosphate, tributyl phosphate, trioctyl phosphate, tributoxyethyl phosphate, triphenyl phosphate, tricresyl phosphate, cresyldiphenyl phosphate, octyldiphenyl phosphate, tri(2-ethylhexyl) phosphate, di-iso-propylphenyl phosphate, trixylenyl phosphate, tris (iso-propylphenyl) phosphate, trinaphthyl phosphate, bisphenol A diphenyl phosphate, and resorcinol diphenyl phosphate. Commonly used triaryl phosphates include, for example, triphenyl phosphate (TPP), cresyl diphenyl phosphate, and tricresyl phosphate. Inorganic phosphate flame retardants such as ammonium polyphosphate (which acts as an intumescent flame retardant) may also be utilized. Hexaphenoxycyclotriphosphazene (phenoxyphosphazene oligomer), such as Fushimi Pharmaceutical Co. Rabitle FP-100 (high purity), Rabitle FP-110 (standard grade) exhibit high thermal stability and can be used with these aromatic polyamides. High thermal stability nitrogen compounds, Melam (1,3,5-triazine-2,4,6-triamine-n-(4,6-diamino-1,3,5-triazine-2-yl), Melem (2,5,8-triamino-tri-s-triazine), and Melon (poly [8-amino-1,3,4,6,7,9,9b-Heptaazaphenalene-2, 5-diyl)imino) can be used as synergists with phosphorus flame retardants.

Phosphinate flame retardants, including those sold by Exolit® as OP1230 and OP1400 may be used in the composition described herein. Phosphinate flame retardants may be desirable because of their high thermal stability and/or anti-corrosive nature.

In some embodiments, the concentration of the flame retardant (or flame reatardant and synergist) ranges from 0 wt % to 35 wt %, based on the total weight of the polymer composition, e.g., from 0.01 wt % to 30 wt %, from 1 wt % to 30 wt %, from 5 wt % to 27 wt %, from 5 wt % to 25 wt %, from 7 wt % to 20 wt %, from 7 wt % to 17 wt %, from 10 wt % to 20 wt %, or from 10 wt % to 15 wt %. In terms of upper limits, the concentration of the flame retardant may be less than 35 wt %, e.g., less than 30 wt %, less than 27 wt %, less than 25 wt %, less than 20 wt %, less than 17 wt %, or less than 15 wt %. In terms of lower limits, the concentration of the flame retardant may be greater than 0 wt %, e.g., greater than 0.01 wt %, greater than 0.1 wt %, greater than 0.5 wt %, greater than 1 wt %, greater than 5 wt %, greater than 7 wt %, or greater than 10 wt %.

These components mentioned herein may be considered optional. In some cases, the disclosed compositions may expressly exclude one or more of the aforementioned components in this section, e.g., via claim language. For example claim language may be modified to recite that the disclosed compositions, processes, etc., do not utilize or comprise one or more of the aforementioned components, e.g., the compositions do not include a flame retardant.

Other Additives

In some embodiments, the polymer composition can optionally include one or more additive(s). In some embodiments, the additives comprise one or more of catalyst, polymers other than polyamide, adhesion promoters, ions, compounds, preservatives such as heat stabilizers and antioxidants, lubricants, flow enhancers, or other ingredients as known in the art. The additive(s) may include at least one of: inorganic stabilizers, organic stabilizers, flame retardants, lubricants, dyes, pigments, nucleating agents, metal flakes, impact modifiers, antistatic agents, conductivity additives, mold-release agents, optical brighteners, adhesion promoters, ageing inhibitors, antioxidants, antiozonants, light stabilizers, UV stabilizers, UV absorbers, UV blockers, inorganic heat stabilizers, organic heat stabilizers, processing aids, crystallization accelerators, crystallization retarders, flow aids, reinforcing agents, e.g., fibrous materials and particulate fillers. This is contemplated herein. For example, the disclosed composition may exclude a flame retardant and/or reinforcing agents (or any other of the aforementioned additives). This provides support for express exclusion of one or more of these components in claim language.

In some embodiments, the provided composition includes one more heat stabilizers other than those mentioned above (a second heat stabilizer). The one or more heat stabilizers of the composition can be selected to improve performance, e.g., at higher operating temperatures, without significantly negatively affecting the strength or other thermal properties of the material.

In some embodiments, the polymer composition comprising an aromatic polyamide having an overall aromaticity greater than 31% includes one or more lubricants selected to serve as processing aids. The type and relative amount of lubricant can be selected to improve processing of the composition, and to contribute to the high strength of the material. In some embodiments, the lubricant includes a wax. In some embodiments, the lubricant consists of a wax. In some embodiments, the wax includes a fatty acid. In some embodiments, the lubricant is a montanate or a montan-based compound, e.g., a calcium montanate or a (partially) saponified ester of a montan-based wax. It has been unexpectedly found that such lubricants work well with the aforementioned aromatic polymer and/or heat stabilizers because the saponified ester waxes have very high thermal stability, which, when used as discussed herein, unexpectedly contributes to improved mold release.

In some embodiments, the lubricant comprises of a fatty acid. In some embodiments, the wax includes a saturated fatty acid. In some embodiments, the lubricant consists of a saturated fatty acid. In some embodiments, the wax includes stearic acid, behenic acid, or salts or combinations thereof. In some embodiments, the lubricant consists of stearic acid, behenic acid, or salts or combinations thereof. The stearate lubricant can include, for example, zinc stearate calcium stearate, aluminum distearate, and/or calcium stearate. One example of a synergistic lubricant commercial product is Licocare from Clariant.

In some embodiments, the combined concentration of the one or more lubricants of the composition ranges from 0 wt % to 2 wt %, e.g., from 0.1 wt % to 2 wt %, from 0.1 wt % to 0.6 wt %, from 0.13 wt % to 0.81 wt %, from 0.18 wt % to 1.1 wt %, from 0.25 wt % to 1.5 wt %, or from 0.33 wt % to 2 wt %. In terms of upper limits, the lubricant concentration can be less than 2 wt %, e.g., less than 1.5 wt %, less than 1.1 wt %, less than 0.81 wt %, less than 0.6 wt %, less than 0.45 wt %, less than 0.33 wt %, less than 0.25 wt %, less than 0.18 wt %, or less than 0.13 wt %. In terms of lower limits, the lubricant concentration can be greater than 0.1 wt %, e.g., greater than 0.13 wt %, greater than 0.18 wt %, greater than 0.25 wt %, greater than 0.33 wt %, greater than 0.45 wt %, greater than 0.6 wt %, greater than 0.81 wt %, greater than 1.1 wt %, or greater than 1.5 wt %.

In some embodiments, the polyamide composition comprises the lubricant in an amount ranging 0.1 wt % to 2 wt %, e.g., from 0.1 wt % to 0.6 wt %, from 0.13 wt % to 0.81 wt %, from 0.18 wt % to 1.1 wt %, from 0.25 wt % to 1.5 wt %, or from 0.33 wt % to 2 wt %. In terms of upper limits, the lubricant concentration can be less than 2 wt %, e.g., less than 1.5 wt %, less than 1.1 wt %, less than 0.81 wt %, less than 0.6 wt %, less than 0.45 wt %, less than 0.33 wt %, less than 0.25 wt %, less than 0.18 wt %, or less than 0.13 wt %. In terms of lower limits, the lubricant concentration can be greater than 0.1 wt %, e.g., greater than 0.13 wt %, greater than 0.18 wt %, greater than 0.25 wt %, greater than 0.33 wt %, greater than 0.45 wt %, greater than 0.6 wt %, greater than 0.81 wt %, greater than 1.1 wt %, or greater than 1.5 wt %.

In some embodiments, the provided composition includes one or more reinforcing agents, e.g., mineral reinforcements or fiber reinforcements or a combination thereof. The reinforcing agents can be selected to further enhance the strength characteristics of the composition without compromising the desired compositional thermal properties. The material of the filler is not particularly limited and may be selected from polyamide fillers known in the art. By way of non-limiting example, the filler may comprise glass- and/or carbon fibers, particulate fillers, such as mineral fillers based on natural and/or synthetic layer silicates, talc, mica, silicate, quartz, titanium dioxide, wollastonite, kaolin, amorphous silicic acids, magnesium carbonate, magnesium hydroxide, chalk, lime, feldspar, barium sulphate, KEVLAR® fiber, basalt fiber, solid or hollow glass balls or ground glass, permanently magnetic or magnetisable metal compounds and/or alloys and/or combinations thereof, and also combinations thereof.

In some embodiments, the combined concentration of the one or more reinforcing agents of the composition ranges from 15 wt % to 60 wt %, e.g., from 15 wt % to 42 wt %, from 19.5 wt % to 46.5 wt %, from 24 wt % to 51 wt %, from 28.5 wt % to 55.5 wt %, or from 33 wt % to 60 wt %. In terms of upper limits, the reinforcing agent concentration can be less than 60 wt %, e.g., less than 55.5 wt %, less than 51 wt %, less than 46.5 wt %, less than 42 wt %, less than 37.5 wt %, less than 33 wt %, less than 28.5 wt %, less than 24 wt %, or less than 19.5 wt %. In terms of lower limits, the reinforcing agent can be greater than 15 wt %, e.g., greater than 19.5 wt %, greater than 24 wt %, greater than 28.5 wt %, greater than 33 wt %, greater than 37.5 wt %, greater than 42 wt %, greater than 46.5 wt %, greater than 51 wt %, or greater than 55.5 wt %.

In other cases, the polyamide compositions is a "neat" composition, e.g., the polyamide composition comprises little or no filler. For example the polyamide compositions may comprise less than 20 wt % filler, e.g., less than 17 wt %, less than 15 wt %, less than 10 wt %, or less than 5 wt %. In terms of ranges, the polyamide compositions may comprise from 0.01 wt % to 20 wt % filler, e.g., from 0.1 wt % to 15 wt % or from 0.1 wt % to 5 wt %. In such cases, the amounts of other components may be adjusted accordingly based on the aforementioned component ranges and limits. It is contemplated that a person of ordinary skill in the art would be able to adjust the concentration of the other components of the polyamide composition in light of the inclusion or exclusion of a glass filler.

Performance Characteristics

An advantage of the compositions disclosed herein is that they are surprisingly capable of simultaneously providing unexpected mechanical performance, e.g., elongation, tensile, and/or impact properties, and/or unexpected electrical performance, e.g., dielectric strength, volume resistivity (both at higher temperatures and in high humidity environments). For reasons discussed above, it is challenging for conventional polyamide compositions to simultaneously provide these different performance characteristics under such temperature and humidity conditions.

Dielectric Strength (23° C., 125° C., 150° C.)

Dielectric strength measures the polyamide composition ability to perform as an insulator. For purposes of this disclosure, dielectric strength (DS) is the maximum electrical potential that the polyamide composition can resist before the electrical current breaks through. Dielectric strength is measured using IEC 60243 and is expressed as kilovolts per unit thickness (millimeters).

While most plastics typically have a dielectric strength from 10 KV/mm to 30 KV/mm, the polymer compositions comprising the aromatic polyamides described herein are able to demonstrate higher insulator performance. In some embodiments, the polymer compositions, demonstrate a dielectric strength of greater than 30 KV/mm, as measured via IEC 60243 and at 23° C., e.g., greater than 35 KV/mm, greater than 38 KV/mm, greater than 39 KV/mm, greater than 40 KV/mm, greater than 41 KV/mm, greater than 42 KV/mm, greater than 43 KV/mm, greater than 44 KV/mm, or greater than 45 KV/mm.

At elevated temperatures, the polymer compositions comprising the aromatic polyamides described herein still have good insulator properties. In some embodiments, the polymer compositions, demonstrate a dielectric strength greater than 25 KV/mm, as measured via IEC 60243 and at 125° C., e.g., greater than 27 KV/mm, greater than 35 KV/mm, greater than 36 KV/mm, greater than 37 KV/mm, greater than 38 KV/mm, greater than 39 KV/mm or greater than 40 KV/mm.

Under even more demanding conditions and elevated temperature the polymer compositions comprising the aromatic polyamides described herein still have good insulator properties. In some embodiments, the polymer compositions, demonstrate a dielectric strength greater than 25 KV/mm, as measured via IEC 60243 and at 150° C., e.g., greater than 27 KV/mm, greater than 35 KV/mm, greater than 36 KV/mm, greater than 37 KV/mm or greater than 38 KV/mm.

In some embodiments, the polymer compositions, demonstrate a dielectric strength under humidity aging (85° C./85% for 1000+ hours) greater than 30 KV/mm, e.g., greater than 33 KV/mm, greater than 35 KV/mm, greater than 36 KV/mm, or greater than 37 KV/mm.

In some embodiments, the polymer compositions, demonstrate a dielectric strength retention under humidity aging (85° C./85% for 1000+ hours) of greater than 5%, e.g., greater than 10%, greater than 25%, greater than 35%, greater than 50%, greater than 75%, or greater than 90%.

Volume Resistivity

The improvement in electrical performance may also be measured by high volume resistivity. To operate as an electric insulator, the polymer composition should have a volume resistivity of greater than 10E+9 Ohm-cm.

In some embodiments, the polymer compositions comprising the aromatic polyamides described herein demonstrate a volume resistivity greater than 1.0E+14 Ohm-cm, as measured via IEC 62631 and at 23° C., e.g., greater than 1.5E+14 Ohm-cm, greater than 1.0E+15, greater than 7.0E+15, greater than 1.0E+16, greater than 1.3E+16, greater than 1.45E+16, greater than 1.5E+16, or greater than 1.6E+16.

In some embodiments, the polymer compositions comprising the aromatic polyamides described herein demonstrate a volume resistivity greater than 1.0E+11 Ohm-cm, as measured via IEC 62631 and at 125° C., e.g., greater than 8.0E+11 Ohm-cm, greater than 1.0E+12, greater than 2.0E+12, greater than 5.0E+12, greater than 1.0E+13, greater than 1.5E+13, greater than 1.75E+13, greater than 2.0E+13, or greater than 1.0E+14.

In some embodiments, the polymer compositions comprising the aromatic polyamides described herein demonstrate a volume resistivity greater than 1.0E+10 Ohm-cm, as measured via IEC 62631 and at 150° C., e.g., greater than 1.0E+11, greater than 5.0E+11, greater than 5.5E+11, greater than 2.0E+11, greater than 1.0E+12, greater than 1.5E+12, or greater than 2.0E+12.

In some embodiments, the polymer compositions comprising the aromatic polyamides described herein demonstrate a volume resistivity under humidity aging (85° C./85% for 1000+ hours) greater than 1.0E+13 Ohm-cm, e.g., greater than 5.0E+13 greater than 1.0E+14, greater than 5.0E+14, or greater than 1.0E+15.

In some embodiments, the polymer compositions, demonstrate a volume resistivity retention under humidity aging (85° C./85% for 1000+ hours) of greater than 5%, e.g., greater than 10%, greater than 25%, greater than 35%, greater than 50%, greater than 75%, or greater than 90%.

Tensile Strength

It can be beneficial for polymeric compositions to have high tensile strengths, e.g., because of the accompanying resistance of products manufactured from these compositions from failure resulting from tensile forces. The compositions disclosed herein can beneficially demonstrate no decrease in tensile strength relative to conventional polymer compositions that have not been modified for enhanced high temperature damping properties. Tensile strengths can be measured with, for example, the standard test method ASTM D882-18 (2018) or ISO 527-2 (2012), optionally measured at 23° C. and/or in some cases under various heat/humidity age conditions.

In some embodiments, the polymer compositions, demonstrate a tensile strength (dry-as-molded) greater than 100 MPa, e.g., greater than 110 MPa, greater than 130 MPa, greater than 140 MPa, greater than 146 MPa, greater than 150 MPa, greater than 160 MPa, greater than 165 MPa, greater than 170 MPa or greater than 173 MPa.

In some embodiments, the polymer compositions, demonstrate a tensile strength (conditioned to equilibrium moisture) greater than 75 MPa, e.g., greater than 85 MPa, greater than 95 MPa, greater than 105 MPa, greater than 110 MPa, greater than 125 MPa, greater than 150 MPa, greater than 165 MPa, or greater than 170 MPa.

In some embodiments, the polymer compositions, demonstrate a tensile strength under humidity aging (85° C./85% for 1000+ hours) of greater than 85 MPa, e.g., greater than 95 MPa, greater than 100 MPa, greater than 105 MPa, greater than 110 MPa, greater than 115 MPa, greater than 120 MPa, or greater than 124 MPa.

Tensile Elongation

The strength of a polymer composition can also be characterized in terms of its elongation properties. It can be beneficial for polymeric materials to have high elongation because products manufactured from these materials are often subjected to stretching forces that can cause a material with low elongation to tear or rupture. The compositions disclosed herein beneficially demonstrate no decrease in elongation relative to conventional polymer compositions that have not been modified for enhanced high temperature damping properties. Elongation can be measured with, for example, the standard test method ASTM D882-18 (2018) or ISO 527-2 (2012).

In some embodiments, the polymer compositions, demonstrate a tensile elongation (dry-as-molded) greater than 1.5, e.g., greater than 1.75, greater than 1.8, greater than 2.0, greater than 2.05, or greater than 2.1, greater than 2.2, greater than 2.4, or greater than 2.6.

In some embodiments, the polymer compositions, demonstrate a tensile elongation (conditioned to equilibrium moisture) greater than 1.5, e.g., greater than 1.75, greater than 1.8, greater than 2.0, greater than 2.05, greater than 2.1, greater than 2.2, greater than 2.4, greater than 2.6, or greater than 2.8.

In some embodiments, the polymer compositions, demonstrate a tensile elongation under humidity aging (85° C./85% for 1000+ hours) of greater than 1.0, e.g., greater than 1.2, greater than 1.5, greater than 1.7, greater than 1.8, greater than 2.0, greater than 2.1, greater than 2.2, greater than 2.4, or greater than 2.6.

Tensile Modulus

The tensile modulus of a polymer composition is a measure of the resistance of the composition to stretching forces. It can be beneficial for polymeric compositions to have low tensile moduli, because a lower modulus can increase the elasticity of products manufactured from the compositions and render these products more amenable to processing steps that involve stretching or thermoforming. The compositions disclosed herein can beneficially demonstrate no increase in tensile moduli relative to conventional polymer compositions that have not been modified for enhanced high temperature damping properties. Tensile moduli can be measured with, for example, the standard test method ASTM D882-18 (2018) or ISO 527-2 (2012).

In some embodiments, the polymer compositions, demonstrate a tensile modulus (dry-as-molded) greater than 10000 MPa, e.g., greater than 10500 MPa, greater than 11000 MPa, greater than 11200 MPa, greater than 11500 MPa, or greater than 12000 MPa.

In some embodiments, the polymer compositions, demonstrate a tensile modulus (conditioned to equilibrium moisture) greater than 8500 MPa, e.g., greater than 9000 MPa, greater than 9500 MPa, greater than 10000 MPa, greater than 11000 MPa, greater than 12000 MPa, or greater than 13000 MPa.

Impact Resistance

The impact strength of a polymer composition is a measure of the resistance of the composition to breakage by shock loading. The compositions disclosed herein can beneficially demonstrate no decrease in impact strength relative to conventional polymer compositions that have not been modified for enhanced high temperature damping properties. Impact strengths can be measured in terms of, for example, notched Charpy impact strengths or un-notched Charpy impact strengths using standard test method ISO 179 (2010).

In some embodiments, the polymer compositions, demonstrate a notched Charpy impact strength (dry-as-molded) greater than 7.0 kJ/m$^2$, e.g., greater than 7.5 kJ/m$^2$, greater than 8.0 kJ/m$^2$, greater than 8.5 kJ/m$^2$, greater than 9.0 kJ/m$^2$, or greater than 9.5 kJ/m$^2$.

In some embodiments, the polymer compositions, demonstrate a notched Charpy impact strength (conditioned to equilibrium moisture) greater than 6.5 kJ/m$^2$, e.g., greater than 7.0 kJ/m$^2$, greater than 7.5 kJ/m$^2$, greater than 8.0 kJ/m², greater than 8.5 kJ/m², greater than 9.0 kJ/m², or greater than 9.5 kJ/m². In some embodiments, the polymer compositions, demonstrate a notched Charpy impact strength under humidity aging (85° C./85% for 1000+ hours) of greater than 6.5 kJ/m², e.g., greater than 7.0 kJ/m², greater than 7.5 kJ/m², greater than 8.0 kJ/m², greater than 8.5 kJ/m², greater than 9.0 kJ/m², or greater than 9.5 kJ/m².

Additional performance feature improvements are also contemplated.

Applications (Connecting Parts/Automotive Parts)

In some cases, the compositions are particularly useful for electric vehicle applications, e.g., high voltage connector electric vehicles (EV) applications, such as battery-electric vehicles (BEVs) and plug-in-hybrid electric vehicles (PHEV). The aforementioned dielectric strength and volume resistivity, especially at higher temperatures has been found to work synergistically in these applications.

EXAMPLES

The present embodiments will now be described in more detail using the following examples and comparative examples. However, the present embodiments are not limited to only these examples.

Six sample compositions were prepared and the aromaticities are shown in Table 1.

TABLE 1

| Resin | Polymer | Wt % Ar |
|---|---|---|
| A | PA 6T/DT | 50 |
| B | PA 6T/6I/66 | 42.5 |
| C | polybutylene terephthalate* | 60 |
| D | polybutylene terephthalate** | 60 |
| E | PA 6T/66/6I | 31 |
| F | PA 66/6T | 20 |
| G | ground 50BW | 0 |

*BASF Ultradur B4450
**DuPont Crastin

Resins A, B, E, and F were combined with additives in the amounts shown in Table 2 and compounding in a twin-screw extruder. The compositions were melted, additives were added to the melt, and the resultant mixture was extruded and pelletized. The materials were then injection molded into specimens for testing. The non-halogenated flame retardant additive was Exolit® OP1230, available from Clariant. The heat stabilizer is a sterically hindered phenol antioxidant (NA-246). The lubricant is a high melting point emulsifying waxes (Licocare RBW 330P TP Vita), available from Clariant. Carbon black (NA-271; 20% C Black in PA6) was also added to Comparative Example C. Comparative Examples A and B are full formulated resins and no further processing was done.

TABLE 2

| | Examples | | Comparative Examples | | | |
|---|---|---|---|---|---|---|
| Sample | 1 | 2 | A | B | C | D |
| Resin Type | A | B | C | D | E | F |
| Resin | 55.0 | 57.0 | — | — | 51.5 | 49.0 |
| Fiberglass | 30.0 | 30.0 | — | — | 30.0 | 30.0 |
| Flame Retardant | 14.0 | 12.0 | — | — | 15.0 | 20.0 |
| NA-271 | — | — | — | — | 2.5 | — |
| Resin G | 0.5 | 0.5 | — | — | 0.5 | 0.5 |

TABLE 2-continued

| | Examples | | Comparative Examples | | | |
|---|---|---|---|---|---|---|
| Sample | 1 | 2 | A | B | C | D |
| Lubricant | 0.3 | 0.3 | — | — | 0.3 | 0.3 |
| NA 246 | 0.2 | 0.2 | — | — | 0.2 | 0.2 |

Example 2 has a melting point (Tm) of 313° C. and crystallization point (Tc) of 256° C. Comparative Example C has a melting point (Tm) of 282° C. and a crystallization point (Tc) of 219° C.

Volume Resistivity

The volume resistivity values is determined in accordance with IEC 62631-3-1:2016. According to this procedure, a standard specimen (e.g., 1 meter cube) is placed between two electrodes. A voltage is applied for sixty (60) seconds and the resistance is measured. Volume resistivity is determined as the ratio of the potential gradient (in V/m) parallel to the current in a material to the current density. In SI units, volume resistivity is numerically equal to the direct-current resistance between opposite faces of a one-meter cube of the material (ohm-m or ohm-cm).

The resins prepared according to Example 1 were tested to determine volume resistivity (VR) at room temperature (23° C.), 125° C., and 150° C., with the results shown below in Table 2. The resins were further tested to determine volume resistivity following exposure to high-moisture conditions after being dry-as-molded. In Test 1, the resins were exposed to 50% humidity at 23° C. for over 48K hours prior to testing. In Test 2, the resins were exposed to 85% humidity at 85° C. for 3K hours, then 50% humidity at 23° C. for over 48K hours prior to testing. These results are also shown in Table 3 below.

TABLE 3

| | Volume Resistivity | | | | |
|---|---|---|---|---|---|
| | Dry-As-Molded | | | With Moisture | |
| Example | VR 23° C. | VR 125° C. | VR 150° C. | Test 1 | Test 2 |
| Ex. 1 | 1.63E+16 | 1.24E+14 | 1.65E+12 | — | — |
| Ex. 2 | 1.47E+16 | 2.02E+13 | 2.01E+11 | 5.40E+19 | 1.20E+15 |
| Comp. A | 1.65E+15 | 1.93E+12 | 5.02E+11 | 1.03E+16 | 3.17E+13 |
| Comp. B | 2.10+15 | 7.72E+11 | 2.06E+11 | 4.71E+17 | 6.97E+15 |
| Comp. C | 6.42E+15 | 2.48E+10 | 1.15E+9 | — | — |
| Comp. D | 2.28E+16 | 1.13E+10 | 1.51E+9 | — | — |

Examples 1 and 2 show smaller changes in volume resistivity from 23° C. to 125° C. than the comparative resins. This is indicative of the increased stability of the resins in Examples 1 and 2 in comparison to Comparative Examples A, B, C, and D.

As can be seen in Table 2, Example 1 displayed excellent volume resistivity over all temperatures tested. Example 2 displayed excellent volume resistivity over all temperatures tested, even after exposure to high moisture conditions, unlike the comparative resins A and B. Overall, Examples 1 and 2 perform significantly better than the comparative resins in all categories.

Dielectric Strength

Dielectric strength is determined in accordance with ASTM D149 and IEC 60243. According to this procedure, the maximum voltage required to produce a dielectric breakdown through the material is measured, and expressed as Volts per unit thickness, with a higher dielectric strength indicating a better insulator.

To test the material, a plaque, generally between 0.8 to 3.2 mm thick, is tested by placing the plaque between two electrodes and applying voltage across the two electrodes. The voltage is raised from zero to the dielectric breakdown at a uniform rate. Breakdown is defined as when an electrical burn-through punctures the sample or the sample decomposes. The rate of voltage rise is determined by the time required for the sample to reach dielectric breakdown. The dielectric strength of the material is then calculated by dividing the breakdown voltage by the thickness of the sample.

The resins prepared according to Example 1 were tested to determine dielectric strength (DS) at room temperature (23° C.), 125° C., 150° C., and after 1K hours at 150° C. with the results shown below in Table 4. The resins were further tested to determine dielectric strength following exposure to high-moisture conditions. In Test 3, the resins were exposed to 50% humidity at 23° C. for over 48 k hours prior to testing. In Test 4, the resins were exposed to 85% humidity at 85° C. for 3 k hours prior to testing. These results are also shown in Table 3 below.

Examples 1 and 2 either provide similar results to the Comparative Examples or outperform the comparative resins. Particularly notable is the performance of Examples 1 and 2 under harsher conditions (longer time at higher temperatures, testing following exposure to high moisture conditions), which is significantly better than the performance of the comparative resins.

Example 4: Tensile Strength, Tensile Elongation, and Tensile Modulus

Tensile strength, elongation, and modulus may be measured according to ASTM D638. Tensile strength describes the amount of force that is applied to a material before it breaks or stretches irreparably. Tensile elongation describes the ductility of a material by measuring the increase in length of a sample after breakage divided by the original length. Tensile modulus describes a material's stiffness by measuring the amount of deformation the material undergoes prior to yielding.

The resins prepared according to Example 1 were tested to determine tensile strength (TS) and tensile elongation (TE). Tensile strength was measured under ambient conditions (Test 5) after 48 k hours at 23° C. and 50% humidity (Test 6), and after 3 k hours at 85° C. and 85% humidity (Test 7). Tensile elongation was measured under ambient conditions (Test 8) after 48 k hours at 23° C. and 50% humidity (Test 9), and after 3 k hours at 85° C. and 85% humidity (Test 10). Tensile modulus (Test 11) is included in Table 4.

TABLE 4

| | Dielectric strength | | | | | |
|---|---|---|---|---|---|---|
| | Dry-as-Molded | | | | With Moisture | |
| Example | DS 23° C. | DS 125° C. | DS 150° C. | DS 150° C. 1K hours | Test 3 | Test 4 |
| Ex. 1 | 42 | 39 | 38 | 40 | — | — |
| Ex. 2 | 44 | 39 | 28 | 42 | 39 | 37 |
| Comp. A | 30 | 27 | 22 | 31 | 28 | 10 |
| Comp. B | 38 | 35 | 36 | 34 | 32 | 15 |
| Comp. C | 38 | 25 | 13 | — | — | — |
| Comp. D | 45 | 21 | 8 | 27 | 35 | 30 |

TABLE 5

| Example | Test 5 TS MPa | Test 6 TS MPa | Test 7 TS MPa | Test 8 TE % | Test 9 TE % | Test 10 TE % | Test 11 Mpa |
|---|---|---|---|---|---|---|---|
| Ex. 1, run 1 | 165 | — | — | 2.7 | — | — | — |
| Ex. 1, run 2 | 155 | — | — | 2.2 | — | — | — |
| Ex. 2 | 175 | 165 | 125 | 2.2 | 2.5 | 2 | 12,500 |
| Comp. A | 112 | 109 | 34 | 2.2 | 1.9 | 0.5 | 8700 |
| Comp. B | 100 | 88 | 26 | 2.3 | 2 | 0.5 | 11,100 |
| Comp. C | 165 | — | — | 2.4 | — | — | — |
| Comp. D | 137 | 138 | 76 | 2.7 | 3.2 | 7.7 | 10,500 |

Impact and Flexural Strength

Impact strength may be measured by determining the amount of energy absorbed by a sample during fracture. Charpy impact and charpy notch tests may be used to determine impact strength using ASTM A370, in which a pendulum of known mass and length is dropped onto a notched sample. The energy transferred to the material may be determined by comparing the difference in height of the pendulum prior to and following the fracture. Flexural strength and flexural modulus describe a material's stiffness, and may be measured according to ASTM D790, in which measures a sample's resistance to deformation when force is applied to it. Finally, heat deformation temperature may be measured according to ASTM D648. The test determines the temperature at which a sample deflects a specific distance under a load.

The resins prepared according to Example 1 were tested to determine notched charpy impact (Test 12), charpy impact following more than 48K hours at 23° C. and 50% humidity (Test 13), and after 3K hours at 85° C. and 85% humidity (Test 14), with the results shown in Table 5. Flexural strength (Test 15) and flexural modulus (Test 16) test results are shown in Table 6. The heat deformation temperature (Test 17) at 1.8 MPa is also shown in Table 6.

TABLE 6

| Example | Test 12 kJ/m² | Test 13 kJ | Test 14 kJ | Test 15 MPa | Test 16 MPa | Test 17 ° C. |
|---|---|---|---|---|---|---|
| Ex. 2 | 8.8 | 8.2 | 6.5 | 284 | 12,4000 | 271 |
| Comp. A | 8.8 | 8.7 | 5.6 | 170 | 8700 | 213 |
| Comp. B | 7 | 6.8 | 3.5 | — | — | — |
| Comp. C | 9.3 | — | — | 270 | 11,500 | 240 |
| Comp. D | 9.6 | 11.2 | 15.6 | — | — | — |

Embodiment

The following embodiments are contemplated. All combinations of features and embodiments are contemplated.

Embodiment 1: A polyamide composition comprising an aromatic polyamide comprising terephthalic units and isophthalic units and having an overall aromaticity greater than 20%; a heat stabilizer; an optional lubricant, wherein the polymer composition demonstrates a tensile strength a tensile strength (dry-as-molded) greater than 146 MPa, measured at 23° C. and a volume resistivity greater than 1.0E+10 Ohm-cm, as measured via IEC 62631 and at 150° C.

Embodiment 2: An embodiment of embodiment 1, wherein the aromatic polyamide has an overall aromaticity greater than 35%.

Embodiment 3: An embodiment of embodiment 1 or 2, wherein the aromatic polyamide comprises terephthalic, isophthalic, and adipic acid repeat units and has an overall aromaticity greater than 32%.

Embodiment 4: An embodiment of any of the embodiments of embodiment 1-3, wherein the aromatic polyamide comprises PA6T/DT, 6I/6T, 6T/6I/66, or 6T/66/6I, or combinations thereof.

Embodiment 5: An embodiment of any of the embodiments of embodiment 1-4, wherein aromatic polymer is PA6T/6I/66 or PA6T/66/6I or a combination thereof.

Embodiment 6: An embodiment of any of the embodiments of embodiment 1-5, wherein the difference in content of terephthalic units and isophthalic units, combined, and adipic units ranges from 30 to 100.

Embodiment 7: An embodiment of any of the embodiments of embodiment 1-6, wherein the aromatic polyamide comprises from 35 wt % to 100 wt % terephthalic units, based on the total weight of the aromatic polyamide.

Embodiment 8: An embodiment of any of the embodiments of embodiment 1-7, wherein the aromatic polyamide comprises from 10 wt % to 70 wt % isophthalic units, based on the total weight of the aromatic polyamide.

Embodiment 9: An embodiment of any of the embodiments of embodiment 1-8, further comprising from 0 wt % to 10 wt % of PA6.

Embodiment 10: An embodiment of any of the embodiments of embodiment 1-9, wherein the polymer composition comprises from 25 wt % to 95 wt % aromatic polyamide, based on the total weight of the polymer composition.

Embodiment 11: An embodiment of any of the embodiments of embodiment 1-10, wherein the heat stabilizer is a hindered phenol.

Embodiment 12: An embodiment of any of the embodiments of embodiment 1-11, wherein the heat stabilizer is N,N'-hexamethylene bis[3-(3,5-dit-butyl-4-hydroxyphenyl) propionamide.

Embodiment 13: An embodiment of any of the embodiments of embodiment 1-12, wherein the lubricant is a monthanate.

Embodiment 14: An embodiment of any of the embodiments of embodiment 1-13, wherein the composition demonstrates a tensile strength greater than 85 MPa when moisture treated for 1000 hours at a temperature of 85° C. and 85% relative humidity, and a volume resistivity greater than 5.0E+13 Ohm-cm, when moisture treated for 1000 hours at a temperature of 85° C. and 85% relative humidity.

Embodiment 15: A polymer composition comprising: a 6T/DT copolymer having an overall aromaticity greater than 25%; a heat stabilizer; an optional lubricant, wherein the polymer composition demonstrates a tensile strength a tensile strength (dry-as-molded) greater than 146 MPa, measured at 23° C. and a volume resistivity greater than 1.0E+10 Ohm-cm, as measured via IEC 62631 and at 150° C.

Embodiment 16: A polymer composition comprising: a 6I/6T copolymer comprising terephthalic units and isophthalic units and having an overall aromaticity greater than 25%; a heat stabilizer; an optional lubricant, wherein the polymer composition demonstrates a tensile strength a tensile strength (dry-as-molded) greater than 146 MPa, measured at 23° C. and a volume resistivity greater than 1.0E+10 Ohm-cm, as measured via IEC 62631 and at 150° C.

Embodiment 17: A polymer composition comprising: a terpolymer comprising terephthalic units, isophthalic units, and adipic acid units, and having an overall aromaticity greater than 25%; a heat stabilizer; an optional lubricant, wherein the polymer composition demonstrates a tensile strength a tensile strength (dry-as-molded) greater than 146 MPa, measured at 23° C. and a volume resistivity greater than 1.0E+10 Ohm-cm, as measured via IEC 62631 and at 150° C.

Embodiment 18: A polymer composition comprising a 6I/6T copolymer comprising: from 25 wt % to 45 wt % from terephthalic units; and from 55 wt % to 75 wt % isophthalic units, based on the total weight of all units; from 0 wt % to 20 wt % of a caprolactam-based polyamide; a heat stabilizer; and an optional lubricant.

Embodiment 19: A polymer composition comprising: a 6T/6I/66 terpolymer comprising: from 50 wt % to 65 wt % terephthalic units; from 20 wt % to 30 wt % isophthalic units; and from 10 wt % to 25 wt % adipic acid units, based on the total weight of all units; and from 0 wt % to 20 wt % of a caprolactam-based polyamide; a heat stabilizer; an optional lubricant.

Embodiment 20: A polymer composition comprising: a 6T/66/6I terpolymer comprising: from 45 wt % to 60 wt % terephthalic units; from 12 wt % to 27 wt % isophthalic units; and from 25 wt % to 40 wt % adipic acid units, based on the total weight of all units; and from 0 wt % to 20 wt % of a caprolactam-based polyamide; a heat stabilizer; an optional lubricant.

Embodiment 21: A polymer composition comprising an aromatic polyamide comprising terephthalic units and isophthalic units and having an overall aromaticity greater than 31%; a heat stabilizer; and an optional lubricant, wherein the polymer composition demonstrates a volume resistivity greater than 1.0E+10 Ohm-cm, as measured via IEC 62631 at 150° C.

Embodiment 22: An embodiment of embodiment 21, wherein the polymer composition demonstrates a dielectric strength of greater than 25 KV/mm as measured via IEC 60243 at 150° C.

Embodiment 23: An embodiment of any of the embodiments of embodiment 21-22, wherein the polymer composition retains dielectric strength retention under humidity aging.

Embodiment 24: An embodiment of any of the embodiments of embodiment 21-23, wherein the aromatic polyamide has an overall aromaticity greater than 35%.

Embodiment 25: An embodiment of any of the embodiments of embodiment 21-24, wherein the aromatic polyamide comprises terephthalic, isophthalic, and adipic acid units and has an overall aromaticity greater than 32%.

Embodiment 26: An embodiment of any of the embodiments of embodiment 21-25, wherein the aromatic polyamide comprises 6I/6T, 6T/6I/66, or 6T/66/6I, or combinations thereof.

Embodiment 27: An embodiment of any of the embodiments of embodiment 21-26, wherein aromatic polymer is PA6T/6I/66 or PA6T/66/6I or a combination thereof.

Embodiment 28: An embodiment of any of the embodiments of embodiment 21-27, wherein the difference in content of terephthalic units and isophthalic units, combined, and adipic units ranges from 30 to 100.

Embodiment 29: An embodiment of any of the embodiments of embodiment 21-28, wherein the aromatic polyamide comprises from 35 wt % to 100 wt % terephthalic units, based on the total weight of the aromatic polyamide.

Embodiment 30: An embodiment of any of the embodiments of embodiment 21-29, wherein the aromatic polyamide comprises from 10 wt % to 70 wt % isophthalic units, based on the total weight of the aromatic polyamide.

Embodiment 31: An embodiment of any of the embodiments of embodiment 21-30, further comprising from 0 wt % to 10 wt % of PA6.

Embodiment 32: An embodiment of any of the embodiments of embodiment 21-31, wherein the polymer composition comprises from 25 wt % to 95 wt % aromatic polyamide, based on the total weight of the polymer composition.

Embodiment 33: An embodiment of any of the embodiments of embodiment 21-32, wherein the heat stabilizer is a hindered phenol.

Embodiment 34: An embodiment of any of the embodiments of embodiment 21-33, wherein the heat stabilizer is N,N'-hexamethylene bis[3-(3,5-dit-butyl-4-hydroxyphenyl) propionamide.

Embodiment 35: An embodiment of any of the embodiments of embodiment 21-34, wherein the lubricant is a montanate.

Embodiment 36: An embodiment of any of the embodiments of embodiment 21-35, wherein the composition demonstrates a tensile strength greater than 85 MPa when moisture treated for 1K hours at a temperature of 85° C. and 85% relative humidity, and a volume resistivity greater than 5.0E+13 Ohm-cm, when moisture treated for 1K hours at a temperature of 85° C. and 85% relative humidity.

Embodiment 37: A polymer composition comprising a 6T/DT copolymer having an overall aromaticity greater than 25%, a heat stabilizer, and an optional lubricant, wherein the polymer composition demonstrates a volume resistivity greater than 1.0E+10 Ohm-cm, as measured via IEC 62631 at 150° C.

Embodiment 38: An embodiment of embodiment 37, wherein the polymer composition demonstrates a dielectric strength of greater than 25 KV/mm as measured via IEC 60243 at 150° C.

Embodiment 39: An embodiment of any of the embodiments of embodiment 37-38, wherein the heat stabilizer is a hindered phenol.

Embodiment 40: An embodiment of any of the embodiments of embodiment 37-39, wherein the heat stabilizer is N,N'-hexamethylene bis[3-(3,5-dit-butyl-4-hydroxyphenyl) propionamide.

Embodiment 41: An embodiment of any of the embodiments of embodiment 37-40, wherein the lubricant is a montanate.

While the invention has been described in detail, modifications within the spirit and scope of the invention will be readily apparent to those of skill in the art in view of the foregoing discussion, relevant knowledge in the art, and references discussed above in connection with the Background and Detailed Description, the disclosures of which are all incorporated herein by reference. In addition, it should be understood that aspects of the invention and portions of various embodiments and various features recited below and/or in the appended claims may be combined or interchanged either in whole or in part. In the foregoing descriptions of the various embodiments, those embodiments which refer to another embodiment may be appropriately combined with other embodiments as will be appreciated by one of skill in the art. Furthermore, those of ordinary skill in the art will appreciate that the foregoing description is by way of example only, and is not intended to limit the invention.

We claim:

1. A polymer composition comprising:
   an aromatic polyamide consisting essentially of: 6T units, 6I units, and 66 units, the aromatic polyamide having an overall aromaticity greater than 31%, the aromatic polyamide containing from 15 wt % to 85 wt % 66 units based on the weight of the aromatic polyamide;
   a heat stabilizer; and
   an optional lubricant,
   wherein the polymer composition demonstrates a volume resistivity greater than 1.0E+10 Ohm-cm, as measured via IEC 62631 at 150° C.

2. The polymer composition of claim 1, wherein the polymer composition demonstrates a dielectric strength of greater than 25 KV/mm as measured via IEC 60243 at 150° C.

3. The polymer composition of claim 1, wherein the polymer composition retains dielectric strength under humidity aging.

4. The polymer composition of claim 1, wherein the aromatic polyamide has an overall aromaticity greater than 35%.

5. The polymer composition of claim 1, wherein the aromatic polyamide has an overall aromaticity of 42.5%.

6. The polymer composition of claim 1, wherein aromatic polymer is PA6T/6I/66 or PA6T/66/6I or a combination thereof.

7. The polymer composition of claim 1, wherein the difference in content of terephthalic units and isophthalic units, combined, and adipic units ranges from 25 wt % to 70 wt %.

8. The polymer composition of claim 1, further comprising from 0.1 wt % to 10 wt % of PA6.

9. The polymer composition of claim 1, wherein the polymer composition comprises from 50 wt % to 60 wt % aromatic polyamide aromatic polyamide, based on the total weight of the polymer composition.

10. The polymer composition of claim 1, wherein the heat stabilizer is a hindered phenol.

11. The polymer composition of claim 1, wherein the heat stabilizer is N,N'-hexamethylene bis[3-(3,5-dit-butyl-4-hydroxyphenyl) propionamide.

12. The polymer composition of claim 1, wherein the lubricant is a montanate.

13. The polymer composition of claim 1, wherein the composition demonstrates a tensile strength greater than 85 MPa when moisture treated for 1K hours at a temperature of 85° C. and 85% relative humidity, and a volume resistivity greater than 5.0E+13 Ohm-cm, when moisture treated for 1K hours at a temperature of 85° C. and 85% relative humidity.

14. The polymer composition of claim 1, wherein the aromatic polyamide comprises from 45 wt % to 60 wt % 6T units, from 15 wt % to 25 wt % 6I units, and from 15 wt % to 35 wt % 66 units, based on the weight of the aromatic polyamide.

15. A polymer composition comprising:
   a 6T/DT copolymer having an overall aromaticity greater than 25%;
   a heat stabilizer;
   a non-halogenated flame retardant; and
   an optional lubricant,
   wherein the polymer composition demonstrates a volume resistivity greater than 1.0E+10 Ohm-cm, as measured via IEC 62631 at 150° C.

16. The polymer composition of claim 15, wherein the polymer composition demonstrates a dielectric strength of greater than 25 KV/mm as measured via IEC 60243 at 150° C.

17. The polymer composition of claim 15, wherein the heat stabilizer is a hindered phenol.

18. The polymer composition of claim 15, wherein the lubricant is a montanate.

19. The polymer composition of claim 15, wherein the polymer composition comprises from 10 wt % to 20 wt % non-halogenated flame retardant based on the total weight of the polymer composition, and wherein the non-halogenated flame retardant comprises a phosphonate flame retardant.

20. The polymer composition of claim 15, wherein the 6T/DT copolymer comprises from 45 wt % to 55 wt % 6T units based on the weight of the 6T/DT copolymer.

* * * * *